(No Model.)
W. H. DYSINGER.
GRAIN DRILL.
No. 331,229. Patented Nov. 24, 1885.
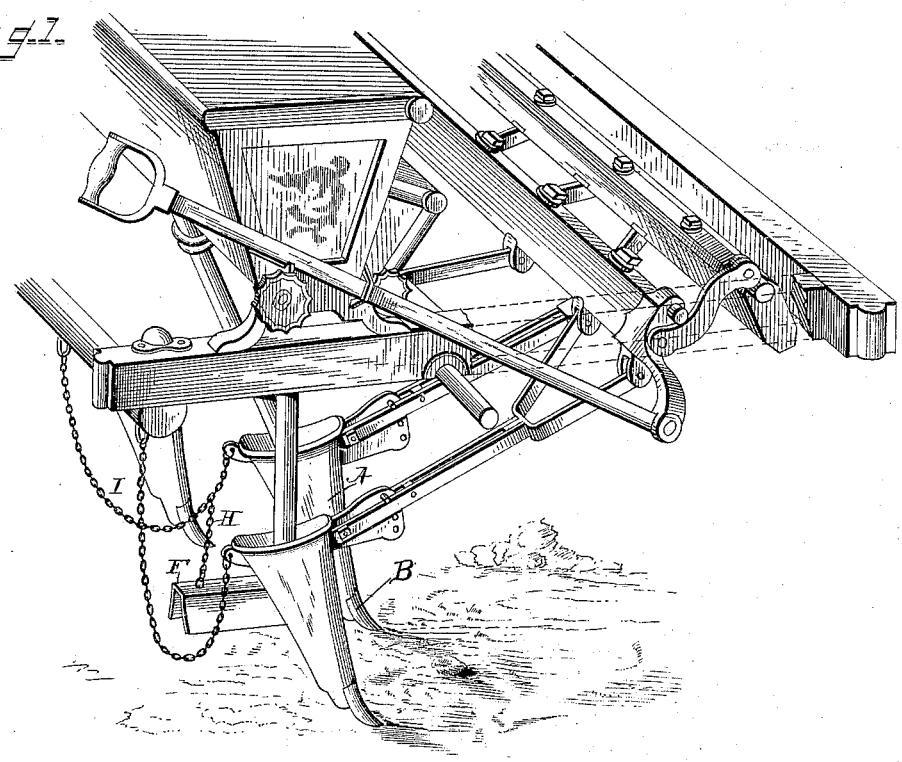
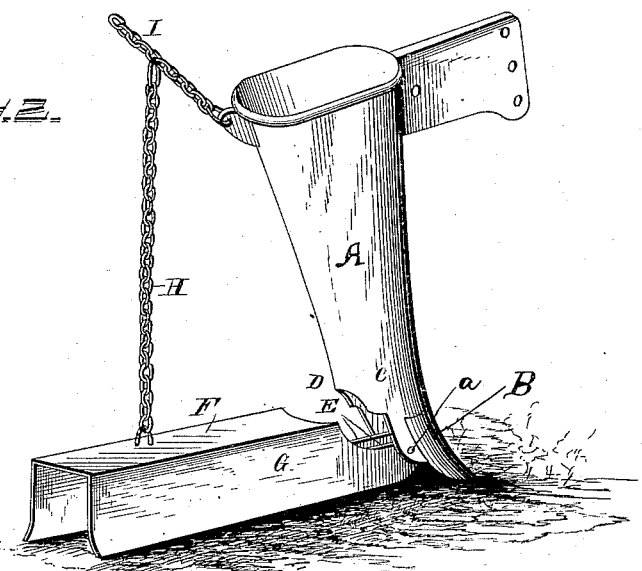
WITNESSES
F. L. Ourand
Bennett S. Jones
INVENTOR
William H. Dysinger
by Louis Bagger & Co.
Attorneys.

UNITED STATES PATENT OFFICE.

WILLIAM H. DYSINGER, OF ROYALTON, NEW YORK.

GRAIN-DRILL.

SPECIFICATION forming part of Letters Patent No. 331,229, dated November 24, 1885.

Application filed August 18, 1885. Serial No. 174,730. (No model.)

*To all whom it may concern:*

Be it known that I, WILLIAM H. DYSINGER, of Royalton, in the county of Niagara and State of New York, have invented certain new and useful Improvements in Grain-Drills; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of a grain-drill provided with my improvement, and Fig. 2 is a similar view of one seed-tube provided with my improvement, taken on an enlarged scale.

Similar letters of reference indicate corresponding parts in both the figures.

My invention has relation to that class of grain-drills in which the teeth are placed in a zigzag line; and it consists in the improved construction and combination of parts of the same, as hereinafter more fully described and claimed.

In the accompanying drawings, the letter A indicates the tubular tooth, provided with the hoe B, which opens the furrow, and at the lower corners of the sides C of the lower end of the tooth, at the point where the tubular tooth is open at its rear side, as shown at D, the forwardly-projecting lips E E of a flanged drag, F, are pivoted, so that the drag can move in a vertical plane. This drag F is made of a single piece of metal, which is bent into a rectangular trough shape, as shown, with its open side downward, and the ears E, formed by the forwardly-projecting ends of the flanges G of the drag, enable the drag to be secured directly to the tooth A by means of a single pivot-bolt, *a*. It will be seen that the forward row of teeth being provided with such drags, which reach with their rear ends in a line past the rear row of teeth, the said rear row of teeth will throw the soil against the drags of the teeth, which will prevent the said soil from falling over the furrow, so that all the furrows of the front and rear rows of teeth will be evenly covered.

For the purpose of raising the drag when the tooth is raised, a chain, H, is secured to the upper side of the rear end of the drag, and the upper end of this chain is secured to the lifting-chain I of the tooth, so that when the tooth is raised the drag will be raised with it, the drag being raised evenly with the tooth. It will thus be seen that by the use of this drag the drill will plant the grain in rows of even depth, as in drills where all the teeth are placed in a straight line, while it at the same time will be capable of planting the grain in rows closer to each other than is possible in a drill having the teeth placed in a straight line, as the drags occupy but small space between the teeth of the rear row.

By means of the chain attached to the rear end of the drag the latter may be manipulated, together with the tooth, in the same manner as the tooth is manipulated in a drill not provided with the drags, the drag being raised and lowered with the tooth, retaining its relative position to it at any position of the tooth.

It will be seen that my improved drag is exceedingly simple in construction, being formed, as described, of a single piece of metal, which is adapted to be connected directly to the drill-tooth without the aid of intervening connections, which have been heretofore employed.

Having thus described my invention, I claim and desire to secure by Letters Patent of the United States—

1. In a grain-drill having its teeth placed in a zigzag line, the combination of the forward teeth, with trough-shaped drags formed each of a single piece of metal, and pivoted directly at their forward ends to the open rear sides of the lower ends of the drill-teeth, as and for the purpose shown and set forth.

2. In a grain-drill having its teeth placed in a zigzag line, the combination of the forward teeth having the rear sides of their lower ends cut away, with rectangular trough-shaped drags formed each of a single piece of metal having lips at the forward ends of its side flanges, and pivoted directly to the rear corners of the sides of the open lower ends of the teeth, as and for the purpose shown and set forth.

3. In a grain-drill having its teeth placed in a zigzag line, the combination of the forward teeth having the usual lifting-chains with trough-shaped drags formed each of a single piece of metal, and pivoted directly at their forward ends to the open rear sides of the lower ends of the teeth, and chains secured to the rear ends of the drags and to the lifting-chains, as and for the purpose shown and set forth.

In testimony that I claim the foregoing as my own I have hereunto affixed my signature in presence of two witnesses.

WILLIAM H. DYSINGER.

Witnesses:
C. M. SOUTHWORTH,
JAMES M. CURTIS.